United States Patent
Doi et al.

(10) Patent No.: US 11,447,634 B2
(45) Date of Patent: Sep. 20, 2022

(54) TREATMENT AGENT FOR CARBON FIBER PRECURSOR AND CARBON FIBER PRECURSOR

(71) Applicant: TAKEMOTO YUSHI KABUSHIKI KAISHA, Aichi-ken (JP)

(72) Inventors: Akihiro Doi, Gamagori (JP); Keiichiro Oshima, Gamagori (JP)

(73) Assignee: TAKEMOTO YUSHI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/264,448

(22) PCT Filed: May 26, 2020

(86) PCT No.: PCT/JP2020/020637
§ 371 (c)(1),
(2) Date: Jan. 29, 2021

(87) PCT Pub. No.: WO2020/241603
PCT Pub. Date: Dec. 3, 2020

(65) Prior Publication Data
US 2022/0089875 A1    Mar. 24, 2022

(30) Foreign Application Priority Data
May 30, 2019    (JP) .............................. JP2019-101341

(51) Int. Cl.
*C08L 83/08* (2006.01)
*D01F 9/22* (2006.01)
*D06M 15/643* (2006.01)

(52) U.S. Cl.
CPC .............. *C08L 83/08* (2013.01); *D01F 9/225* (2013.01); *D06M 15/6436* (2013.01); *C08L 2205/02* (2013.01)

(58) Field of Classification Search
None
See application file for complete search history.

(56) References Cited

U.S. PATENT DOCUMENTS

2012/0021125 A1* 1/2012 Nakayama .......... D06M 15/647
                                                    427/227

FOREIGN PATENT DOCUMENTS

| CN | 103806131 A | | 5/2014 |
| EP | 0174806 A2 | | 3/1986 |
| JP | 2001172879 A | | 6/2001 |
| JP | 2007113141 A | | 5/2007 |
| JP | 2008138296 A | | 6/2008 |
| JP | 2011042916 A | | 3/2011 |
| JP | 2011058129 A | | 3/2011 |
| JP | 2012102429 A | | 5/2012 |
| JP | 2015030931 | * | 2/2015 |
| JP | 2015030931 A | | 2/2015 |
| WO | 2014050639 A1 | | 4/2014 |
| WO | 2020241603 A1 | | 12/2020 |

OTHER PUBLICATIONS

Machine translation of Aso et al. JP2015030931 (Year: 2015).*
International Search Report issued in International Application No. PCT/JP2020/020637, dated Aug. 4, 2020; 3 pages.
Written Opinion issued in International Application No. PCT/JP2020/020637, dated Aug. 4, 2020; 3 pages.
Communication Pursuant to Article 94(3) EPC for Application No. 20814481.6 dated Jul. 4, 2022.

* cited by examiner

*Primary Examiner* — Robert T Butcher
(74) *Attorney, Agent, or Firm* — Cantor Colburn LLP

(57) ABSTRACT

Carbon fiber precursor treatment agents include a nonionic surfactant, an amino-modified silicone, and a dimethyl silicone with a kinematic viscosity at 25° C. of 5 to 200 mm$^2$/s. The mass ratio of the content of the amino-modified silicone with respect to the content of the dimethyl silicone is 99.9/0.1 to 90/10. Alternatively, when the total content of the nonionic surfactant, the amino-modified silicone, and the dimethyl silicone is taken as 100 parts by mass, the nonionic surfactant is contained at a ratio of 9 to 85 parts by mass, the amino-modified silicone is contained at a ratio of 10 to 90.9 parts by mass, and the dimethyl silicone is contained at a ratio of 0.1 to 5 parts by mass.

7 Claims, No Drawings

TREATMENT AGENT FOR CARBON FIBER PRECURSOR AND CARBON FIBER PRECURSOR

TECHNICAL FIELD

The present invention relates to a carbon fiber precursor treatment agent capable of suppressing fluff in a spinning process of carbon fiber precursors and a carbon fiber precursor to which the carbon fiber precursor treatment agent is adhered.

BACKGROUND ART

Generally, carbon fibers are widely used in respective fields of building materials, transportation equipment, etc., for example, as a carbon fiber composite in combination with a matrix resin such as an epoxy resin. Ordinarily, carbon fibers are manufactured as a carbon fiber precursor, for example, through a process of spinning acrylic fibers, a process of stretching the fibers, a flameproofing process, and a carbonization process. A carbon fiber precursor treatment agent is used at times on the carbon fiber precursor to suppress agglutination or fusion among fibers that occurs in the carbon fiber manufacturing process.

Conventionally, the carbon fiber precursor treatment agents disclosed in Patent Documents 1 and 2 are known. Patent Document 1 discloses a carbon fiber sizing agent composition containing a neutralized salt of a polyalkylene polyamine fatty acid condensate obtained by making a polyalkylene polyamine and a fatty acid having a saturated or unsaturated straight chain or branch chain and with 8 to 24 carbon atoms react. Patent Document 2 discloses a carbon fiber precursor fiber oil agent containing an amino-modified silicone with a kinematic viscosity of 1,500 cSt, a nonionic surfactant, and a dimethyl silicone with a kinematic viscosity of 100,000 cSt.

PRIOR ART LITERATURE

Patent Literature

Patent Document 1: Japanese Laid-Open Patent Publication No. 2008-138296
Patent Document 2: Japanese Laid-Open Patent Publication No. 2007-113141

SUMMARY OF THE INVENTION

Problems that the Invention Is to Solve

However, the conventional carbon fiber precursor treatment agent is still insufficient in an effect of suppressing fluff of a yarn in a spinning process of carbon fiber precursors.

A problem to be solved by the present invention is to provide a carbon fiber precursor treatment agent capable of suppressing fluff of a yarn in a spinning process of carbon fiber precursors and a carbon fiber precursor to which the carbon fiber precursor treatment agent is adhered.

Means for Solving the Problems

Thus, as a result of performing research toward solving the above problem, the inventors of the present invention found that a carbon fiber precursor treatment agent that contains a nonionic surfactant, an amino-modified silicone, and a dimethyl silicone with specific viscosity is truly favorable.

That is, one aspect of the present invention provides a carbon fiber precursor treatment agent characterized by containing a nonionic surfactant, an amino-modified silicone, and a dimethyl silicone with a kinematic viscosity at 25° C. of 5 to 200 mm$^2$/s.

Preferably with the carbon fiber precursor treatment agent, the mass ratio of the content of the amino-modified silicone with respect to the content of the dimethyl silicone is 99.9/0.1 to 90/10.

Preferably with the carbon fiber precursor treatment agent, the amino-modified silicone has a kinematic viscosity at 25° C. of 50 to 800 mm$^2$/s.

When the total content of the nonionic surfactant, the amino-modified silicone, and the dimethyl silicone is taken as 100 parts by mass, the carbon fiber precursor treatment agent preferably contains the nonionic surfactant at a ratio of 9 to 85 parts by mass, the amino-modified silicone at a ratio of 10 to 90.9 parts by mass, and the dimethyl silicone at a ratio of 0.1 to 5 parts by mass.

Another aspect of the present invention provides a carbon fiber precursor to which the carbon fiber precursor treatment agent is adhered.

Effect of the Invention

The present invention succeeds in suppressing fluff of a yarn in a spinning process.

MODES FOR CARRYING OUT THE INVENTION

First Embodiment

A first embodiment that embodies a carbon fiber precursor treatment agent according to the present invention (hereinafter referred to simply as treatment agent) will now be described.

The treatment agent of the present embodiment contains, in addition to a nonionic surfactant, an amino-modified silicone, and a dimethyl silicone with a kinematic viscosity at 25° C. of 5 to 200 mm$^2$/s as essential components. There is no particular restriction in the type of the nonionic surfactant and examples thereof include an adduct of an alkylene oxide to an alcohol or a carboxylic acid.

Examples of the alcohol used as a raw material of the nonionic surfactant include (1) straight-chain alkyl alcohols, such as methanol, ethanol, propanol, butanol, pentanol, hexanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, pentacosanol, hexacosanol, heptacosanol, octacosanol, nonacosanol, and triacontanol, (2) branched alkyl alcohols, such as isopropanol, isobutanol, isohexanol, 2-ethylhexanol, isononanol, isodecanol, isotridecanol, isotetradecanol, isotriacontanol, isohexadecanol, isoheptadecanol, isooctadecanol, isononadecanol, isoeicosanol, isoheneicosanol, isodocosanol, isotricosanol, isotetracosanol, isopentacosanol, isohexacosanol, isoheptacosanol, isooctacosanol, isononacosanol, and isopentadecanol, (3) straight-chain alkenyl alcohols, such as tetradecenol, hexadecenol, heptadecenol, octadecenol, and nonadecenol, (4) branched alkenyl alcohols, such as isohexadecenol and isooctadecenol, and (5) cyclic alkyl alcohols, such as cyclopentanol and cyclohexanol.

Examples of the carboxylic acid used as a raw material of the nonionic surfactant include (6) straight-chain alkyl carboxylic acids, such as octylic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, and docosanoic acid, (7) branched alkyl carboxylic acids, such as 2-ethylhexanoic acid, isododecanoic acid, isotridecanoic acid, isotetradecanoic acid, isohexadecanoic acid, and isooctadecanoic acid, (8) straight-chain alkenyl carboxylic acids, such as octadecenoic acid, octadecadienoic acid, and octadecatrienoic acid, (9) aromatic alcohols, such as phenol, benzyl alcohol, monostyrenated phenol, distyrenated phenol, and tristyrenated phenol, and (10) aromatic carboxylic acids, such as benzoic acid.

Examples of the alkylene oxide used as a raw material of the nonionic surfactant include ethylene oxide and propylene oxide.

Even among these nonioinic surfactants, a compound is preferable to which ethylene oxide has been made to undergo an addition reaction at a ratio of 1 to 50 moles with respect to 1 mole of an organic alcohol with 4 to 40 carbon atoms, such as butanol, pentanol, hexanol, octanol, nonanol, decanol, undecanol, dodecanol, tridecanol, tetradecanol, pentadecanol, hexadecanol, heptadecanol, octadecanol, nonadecanol, eicosanol, isobutanol, isohexanol, 2-ethylhexanol, isononanol, isodecanol, isotridecanol, isotetradecanol, tetradecenol, hexadecenol, heptadecenol, octadecenol, nonadecenol, or other straight-chain alkenyl alcohol, or phenol, benzyl alcohol, monostyrenated phenol, distyrenated phenol, tristyrenated phenol, or other aromatic alcohol. Any of these nonionic surfactants may be used alone or two or more types may be used in combination.

The amino-modified silicone has a polysiloxane skeleton constituted of a repetition of (—Si—O—) and is a compound in which a portion of an alkyl side chain bonded to the silicon atom is modified by an amino-modified group. The amino-modified group may be bonded to either or both a side chain and a terminal of the silicone that is the main chain. Examples of the amino-modified group include an amino group and an organic group having an amino group. The organic group having an amino group is represented by, for example, the following Chemical Formula 1.

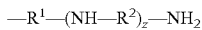

$-R^1-(NH-R^2)_z-NH_2$          Chemical Formula 1

(In Chemical Formula 1, $R^1$ and $R^2$ are alkylene groups with 2 to 4 carbon atoms each and may be the same as or different from each other. z is an integer of 0 or 1.)

Examples of the amino-modified silicone having the amino-modified group of Chemical Formula 1 include dimethylsiloxane-methyl(aminopropyl)siloxane copolymer (aminopropyl dimethicone) and aminoethyl aminopropyl methylsiloxane-dimethylsiloxane copolymer (amodimethicone).

A lower limit of the kinematic viscosity at 25° C. of the amino-modified silicone is not particularly restricted but is preferably not less than 20 mm$^2$/s and more preferably not less than 50 mm$^2$/s. An upper limit of the kinematic viscosity at 25° C. of the amino-modified silicone is not particularly restricted but is preferably not more than 4,000 mm$^2$/s and more preferably not more than 800 mm$^2$/s. By specifying the kinematic viscosity to be within this range, the effect of suppressing fluff of a yarn with the treatment agent applied is more improved. Also, the strength of a carbon fiber obtained from a carbon fiber precursor with the treatment agent applied is more improved.

The dimethyl silicone refers to a dimethylpolysiloxane with which side chains and terminals of the polysiloxane are all methyl groups. The type of dimethyl silicone is not particularly restricted and that which is known can be adopted as appropriate. A lower limit of the kinematic viscosity at 25° C. of the dimethyl silicone is not less than 5 mm$^2$/s and preferably not less than 10 mm$^2$/s. An upper limit of the kinematic viscosity at 25° C. of the dimethyl silicone is not more than 200 mm$^2$/s and preferably not more than 100 mm$^2$/s. By specifying the kinematic viscosity to be within this range, the effect of suppressing fluff of a yarn with the treatment agent applied is more improved. Also, the strength of a carbon fiber obtained from a carbon fiber precursor with the treatment agent applied is more improved. Also, the emulsion stability of the treatment agent is more improved. Any of such dimethyl silicones may be used alone or two or more types may be used in combination.

The mixing ratio of the amino-modified silicone and the dimethyl silicone in the treatment agent is not particularly restricted. From a standpoint of further improving the strength of a carbon fiber obtained from a carbon fiber precursor with the treatment agent applied, the mass ratio of the content of the amino-modified silicone with respect to the content of the dimethyl silicone is preferably 99.9/0.1 to 90/10.

The mixing ratio of the nonionic surfactant, the amino-modified silicone, and the dimethyl silicone in the treatment agent is not particularly restricted. When the total content of the nonionic surfactant, the amino-modified silicone, and the dimethyl silicone is taken as 100 parts by mass, it is preferable from a standpoint of further improving the strength of a carbon fiber obtained from a carbon fiber precursor with the treatment agent applied that the nonionic surfactant is contained at a ratio of 9 to 85 parts by mass, the amino-modified silicone is contained at a ratio of 10 to 90.9 parts by mass, and the dimethyl silicone is contained at a ratio of 0.1 to 5 parts by mass. More preferably, the nonionic surfactant is contained at a ratio of 9 to 60 parts by mass, the amino-modified silicone is contained at a ratio of 36 to 90.9 parts by mass, and the dimethyl silicone is contained at a ratio of 0.1 to 4 parts by mass.

Second Embodiment

Next, a second embodiment that embodies a carbon fiber precursor according to the present invention will be described. The carbon fiber precursor of the present embodiment has the treatment agent of the first embodiment adhered thereto.

In a method for manufacturing a carbon fiber using the carbon fiber precursor of the present embodiment, first, a yarn manufacturing process is performed in which the carbon fiber precursor is obtained by adhering the treatment agent described above to a raw material fiber of the carbon fiber precursor and thereafter manufactured into a yarn. Next, a flameproofing process of converting the carbon fiber precursor manufactured in the yarn manufacturing process to a flameproofed fiber in an oxidizing atmosphere at 200 to 300° C. and preferably 230 to 270° C. and a carbonization process of carbonizing the flameproofed fiber in an inert atmosphere at 300 to 2,000° C. and preferably 300 to 1,300° C. are performed.

The yarn manufacturing process is a process in which the carbon fiber precursor obtained by adhering the treatment agent of the first embodiment to the raw material fiber of the carbon fiber precursor is manufactured into a yarn and includes an adhesion process and a drawing process.

The adhesion process is a process of adhering the treatment agent after spinning raw material fibers of the carbon fiber precursor. That is, the treatment agent is adhered to the raw material fibers of the carbon fiber precursor in the adhesion process. Here, although the raw material fibers of the carbon fiber precursor are drawn from immediately after being spun, a high ratio drawing after the adhesion process is referred to in particular as the "drawing process." The drawing process may be a wet heat drawing method using high temperature steam or a dry heat drawing method using a hot roller.

Examples of the raw material fibers of the carbon fiber precursor include acrylic fibers. The acrylic fibers are preferably constituted of fibers with a main component of polyacrylonitrile obtained by copolymerizing not less than 90% by mole of acrylonitrile and not more than 10% by mole of a flameproofing promoting component. As the flameproofing promoting component, for example, a vinyl-group-containing compound having copolymerizability with acrylonitrile can be used favorably. A single fiber fineness of the carbon fiber precursor is not particularly restricted but is preferably 0.1 to 2.0 dTex from a standpoint of balance of performance and manufacturing cost. The number of single fibers constituting a fiber bundle of the carbon fiber precursor is not particularly restricted but is preferably 1,000 to 96,000 fibers from the standpoint of balance of performance and manufacturing cost.

Although the treatment agent may be adhered to the raw material fiber of the carbon fiber precursor at any stage of the yarn manufacturing process, it is preferably adhered once before the drawing process. Adhesion may be performed at any stage as long as the stage is that before the drawing process. For example, adhesion may be performed immediately after spinning. Further, adhesion may be performed again at any stage after the drawing process. For example, adhesion may be performed again immediately after the drawing process, adhesion may be performed again at a winding stage, and adhesion may be performed again immediately before the flameproofing process. The number of times of performing adhesion in the yarn manufacturing process is not particularly restricted.

Although the ratio at which the treatment agent of the first embodiment is adhered to the carbon fiber precursor is not particularly restricted, the treatment agent (not including a solvent) is preferably adhered such as to be 0.1% to 2% by mass and more preferably adhered such as to be 0.3% to 1.2% by mass with respect to the carbon fiber precursor. By this arrangement, effects of the present invention are more improved. A known method can be applied as a method of adhesion of the treatment agent of the first embodiment and examples of such a method include a spray oiling method, an immersion oiling method, a roller oiling method, and a guide oiling method using a metering pump. A form of the treatment agent of the first embodiment in adhering it to the fibers may, for example, be an organic solvent solution or an aqueous liquid.

Actions and effects of the carbon fiber precursor treatment agent and the carbon fiber precursor of the embodiments will now be described.

(1) With the embodiments, fluff of a yarn with the treatment agent applied can be suppressed in a spinning process of carbon fiber precursors. Also, the strength of a carbon fiber obtained from a carbon fiber precursor with the treatment agent applied is improved. Also, the emulsion stability of the treatment agent is more improved.

The embodiments described above may be modified as follows.

To the treatment agent of the embodiment described above, a component to be usually used in a treatment agent such as a binding agent, an antioxidant, or a ultraviolet absorber may be further added as a stabilizer or an antistatic agent for keeping the quality of the treatment agent, within a range not impairing the effects of the present invention.

EXAMPLES

Examples will now be given below to describe the features and effects of the present invention more specifically, but the present invention is not limited to these examples. In the following description of working examples and comparative examples, "parts" means parts by mass and "%" means % by mass.

Experimental Part 1 (Preparation of Carbon Fiber Precursor Treatment Agents)

Example 1

178 g of an amino-modified silicone (A-1), 2 g of a dimethyl silicone (B-1), and 20 g of a nonionic surfactant (N-1) were added to a beaker and mixed well. While continuing to stir, ion exchanged water was added gradually to attain a solids concentration of 30% and thereby prepare a 30% aqueous liquid of a carbon fiber precursor treatment agent of Example 1.

Respective carbon fiber precursor treatment agents of Examples 2 to 9 and Comparative Examples 1 to 5 were prepared using the respective components shown in Table 1 and by the same method as in Example 1.

TABLE 1

| | Amino-modified silicone | | Dimethyl silicone | | Nonionic surfactant | | | | Carbon fiber strength (GPa) | Evaluation of carbon fiber strength |
|---|---|---|---|---|---|---|---|---|---|---|
| | Type | Ratio (parts by mass) | Type | Ratio (parts by mass) | Type | Ratio (parts by mass) | Fluff | Emulsion stability | | |
| Example 1 | A-1 | 89 | B-1 | 1 | N-1 | 10 | ○○ | ○○ | 3.8 | ○○ |
| Example 2 | A-1 | 89 | B-2 | 1 | N-1 | 10 | ○○ | ○○ | 3.7 | ○○ |
| Example 3 | A-2 | 87 | B-1 | 3 | N-1 | 10 | ○○ | ○○ | 3.8 | ○○ |
| Example 4 | A-1 | 79 | B-1 | 1 | N-1 | 20 | ○○ | ○○ | 3.8 | ○○ |
| Example 5 | A-1 | 25 | B-1 | 5 | N-1 | 70 | ○○ | ○○ | 3.5 | ○ |
| Example 6 | A-3 | 70 | B-1 | 2 | N-1 | 28 | ○ | ○○ | 3.9 | ○○ |
| Example 7 | A-4 | 70 | B-1 | 2 | N-1 | 28 | ○ | ○○ | 3.9 | ○○ |
| Example 8 | A-1 | 60 | B-1 | 10 | N-1 | 30 | ○○ | ○○ | 3.5 | ○ |

TABLE 1-continued

|  | Amino-modified silicone | | Dimethyl silicone | | Nonionic surfactant | | Fluff | Emulsion stability | Carbon fiber strength (GPa) | Evaluation of carbon fiber strength |
|---|---|---|---|---|---|---|---|---|---|---|
|  | Type | Ratio (parts by mass) | Type | Ratio (parts by mass) | Type | Ratio (parts by mass) | | | | |
| Example 9 | A-5 | 89 | B-1 | 1 | N-1 | 10 | ○ | ○○ | 3.5 | ○ |
| Comparative Example 1 | A-1 | 89 | rb-1 | 1 | N-1 | 10 | x | x | 3.6 | ○ |
| Comparative Example 2 | A-1 | 90 | B-1 | 10 | N-1 | 0 | x | x | 3.0 | x |
| Comparative Example 3 | A-1 | 0 | B-1 | 0 | N-1 | 100 | x | x | 2.0 | x |
| Comparative Example 4 | A-1 | 0 | B-1 | 90 | N-1 | 10 | x | x | 2.2 | x |
| Comparative Example 5 | A-1 | 89 | rb-2 | 1 | N-1 | 10 | x | x | 2.9 | x |

In Table 1,

A-1 represents an amino-modified silicone with a kinematic viscosity at 25° C. of 90 mm$^2$/s and an amino equivalent of 4,000, A-2 represents an amino-modified silicone with a kinematic viscosity at 25° C. of 650 mm$^2$/s and an amino equivalent of 2,000, A-3 represents an amino-modified silicone with a kinematic viscosity at 25° C. of 3,500 mm$^2$/s and an amino equivalent of 2,000, A-4 represents an amino-modified silicone with a kinematic viscosity at 25° C. of 1,500 mm$^2$/s and an amino equivalent of 3,800, A-5 represents an amino-modified silicone with a kinematic viscosity at 25° C. of 40 mm$^2$/s and an amino equivalent of 4,000, B-1 represents a polydimethylsiloxane with a viscosity at 25° C. of 10 mm$^2$/s, B-2 represents a polydimethylsiloxane with a viscosity at 25° C. of 100 mm$^2$/s, rb-1 represents a polydimethylsiloxane with a viscosity at 25° C. of 1,000 mm$^2$/s, rb-2 represents a polydimethylsiloxane with a viscosity at 25° C. of 2 mm$^2$/s, and N-1 represents a nonionic surfactant in which 10 moles of ethylene oxide is added to an aliphatic alcohol with 12 carbon atoms.

Experimental Part 2 (Preparation of Carbon Fiber Precursor and Carbon Fiber)

Carbon fiber precursors and carbon fibers were manufactured using the carbon fiber precursor treatment agents prepared in Experimental Part 1.

A copolymer of 1.80 limiting viscosity constituted of 95% by mass acrylonitrile, 3.5% by mass methyl acrylate, and 1.5% by mass methacrylic acid was dissolved in dimethylacetamide (DMAC) to prepare a spinning dope with a polymer concentration of 21.0% by mass and a viscosity at 60° C. of 500 poise. The spinning dope was discharged at a draft ratio of 0.8 from a spinneret with 12,000 holes of 0.075 mm hole diameter (inner diameter) into a coagulation bath of a 70% by mass aqueous solution of DMAC maintained at a spinning bath temperature of 35° C.

The coagulated yarn was drawn by 5 times at the same time as being desolvated in a rinse tank to prepare acrylic fiber strands in a water-swollen state. To these fiber strands, 4% ion exchanged water solutions of the carbon fiber precursor treatment agents prepared in Experimental Part 1 were each applied by an immersion method such that a solids adhesion amount of the carbon fiber precursor treatment agent would be 1% by mass (not including the solvent). Thereafter, the acrylic fiber strands were subject to dry densification by a heating roller set at 130° C., further subject to drawing by 1.7 times between heating rollers set at 170° C., and thereafter wound around a bobbin to obtain a carbon fiber precursor. Yarns were unwound from the carbon fiber precursor and, after being flameproofed for 1 hour under an air atmosphere in a flameproofing furnace having a temperature gradient of 230° C. to 270° C., were successively converted to carbon fibers by baking under a nitrogen atmosphere in a carbonizing furnace having a temperature gradient of 300° C. to 1,300° C., and thereafter wound around a bobbin. In addition to fluffs of the carbon fiber precursors, emulsion stabilities of the carbon fiber precursor treatment agents and strengths of the carbon fibers were evaluated as described below.

Experimental Part 3 (Evaluation)

Evaluation of Fluff

The number of fluffs per hour measured in the manufacturing process of each carbon fiber precursor by a fluff counter (DT-105 made by Toray Engineering Co., Ltd.) installed immediately before a winder was evaluated according to the following evaluation criteria. The results are indicated in the "Fluff" column of Table 1.

Evaluation Criteria for Fluff

○○ (excellent): The number of fluffs was 0 to 5.
○ (good): The number of fluffs was 6 to 10.
x (poor): The number of fluffs was not less than 11.

Evaluation of Emulsion Stability

Each aqueous liquid of carbon fiber precursor treatment agent of 30% solids concentration prepared in Experimental Part 1 was left to stand for 3 months at 25° C. and thereafter, its appearance was observed with the naked eye and evaluated according to the following evaluation criteria. The results are indicated in the "Emulsion stability" column of Table 1.

Evaluation Criteria for Emulsion Stability

○○ (excellent): Separation or precipitation was hardly seen and satisfactory emulsion property was maintained.

○ (good): Although slight precipitation was seen, the emulsion property was satisfactory and of a level that would not present problem in terms of practical use.

x (poor): The emulsion broke down and precipitation and separation occurred.

Evaluation of Carbon Fiber Strength

The strengths of the carbon fibers obtained as described above were measured in accordance with JIS R 7606 and evaluated according to the following evaluation criteria. The results are shown in the "Carbon fiber strength" and "Evaluation of carbon fiber strength" columns of Table 1.

Evaluation Criteria for Carbon Fiber Strength

○○ (excellent): Not less than 3.65 GPa.
○ (good): Not less than 3.3 GPa but less than 3.65 GPa.
x (poor): Less than 3.3 GPa.

As is clear from the results shown in Table 1, by the present invention, the effects of enabling suppression of fluff of a yarn in a spinning process of carbon fiber precursors and suppression of decrease in strength of a carbon fiber as well as being excellent in emulsion stability are provided.

The invention claimed is:

1. A carbon fiber precursor treatment agent comprising a nonionic surfactant, an amino-modified silicone, and a dimethylpolysiloxane, in which all side chains and terminals of the polysiloxane are methyl groups, with a kinematic viscosity at 25° C. of 5 to 200 mm$^2$/s, wherein
the mass ratio of the content of the amino-modified silicone with respect to the content of the dimethylpolysiloxane is 99.9/0.1 to 90/10.

2. The carbon fiber precursor treatment agent according to claim 1, wherein when the total content of the nonionic surfactant, the amino-modified silicone, and the dimethylpolysiloxane is taken as 100 parts by mass, the nonionic surfactant is contained at a ratio of 9 to 85 parts by mass, the amino-modified silicone is contained at a ratio of 10 to 90.9 parts by mass, and the dimethylpolysiloxane is contained at a ratio of 0.1 to 5 parts by mass.

3. A carbon fiber precursor treatment agent comprising a nonionic surfactant, an amino-modified silicone, and a dimethylpolysiloxane, in which all side chains and terminals of the polysiloxane are methyl groups, with a kinematic viscosity at 25° C. of 5 to 200 mm$^2$/s, wherein
when the total content of the nonionic surfactant, the amino-modified silicone, and the dimethylpolysiloxane is taken as 100 parts by mass, the nonionic surfactant is contained at a ratio of 9 to 85 parts by mass, the amino-modified silicone is contained at a ratio of 10 to 90.9 parts by mass, and the dimethylpolysiloxane is contained at a ratio of 0.1 to 5 parts by mass.

4. The carbon fiber precursor treatment agent according to claim 1, wherein the amino-modified silicone has a kinematic viscosity at 25° C. of 50 to 800 mm$^2$/s.

5. A carbon fiber precursor to which the carbon fiber precursor treatment agent according to claim 1 is adhered.

6. The carbon fiber precursor treatment agent according to claim 3, wherein the amino-modified silicone has a kinematic viscosity at 25° C. of 50 to 800 mm$^2$/s.

7. A carbon fiber precursor to which the carbon fiber precursor treatment agent according to claim 3 is adhered.

* * * * *